United States Patent
Yamamoto

(12) United States Patent (10) Patent No.: US 6,933,690 B2
(45) Date of Patent: Aug. 23, 2005

(54) MOTOR DRIVER

(75) Inventor: Seiichi Yamamoto, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 13 days.

(21) Appl. No.: 10/771,499

(22) Filed: Feb. 5, 2004

(65) Prior Publication Data

US 2005/0001569 A1 Jan. 6, 2005

(30) Foreign Application Priority Data

Feb. 5, 2003 (JP) ........................................ 2003-028331

(51) Int. Cl.⁷ ............................................... H02P 5/06
(52) U.S. Cl. ...................................... 318/254; 318/439
(58) Field of Search ................................. 318/138, 139, 318/254, 727, 772, 430–439, 495, 599, 811

(56) References Cited

U.S. PATENT DOCUMENTS 5,847,536 A * 12/1998 Miyazaki et al. ........... 318/811
5,868,846 A * 2/1999 Sowden ....................... 118/668
6,426,602 B1 * 7/2002 McCann et al. ............. 318/432

FOREIGN PATENT DOCUMENTS

| JP | 10-191680 | 7/1998 |
| JP | 2001-136772 | 5/2001 |

* cited by examiner

Primary Examiner—Paul Ip
(74) Attorney, Agent, or Firm—Arent Fox, PLLC

(57) ABSTRACT

An amplitude normalization circuit 13 finds the amplitude of position signals outputted from a position detection circuit 6 on the basis of Hall signals from Hall elements 2a to 2c. The position signals from the position detection circuit 6 are then divided by the thus found amplitude and are thereby normalized. Multiplier circuits 7a to 7c then multiply by a torque error signal limited by a limiter 5 the position signals normalized by the amplitude normalization circuit 13 to generate pseudo-sinusoidal signals.

17 Claims, 7 Drawing Sheets

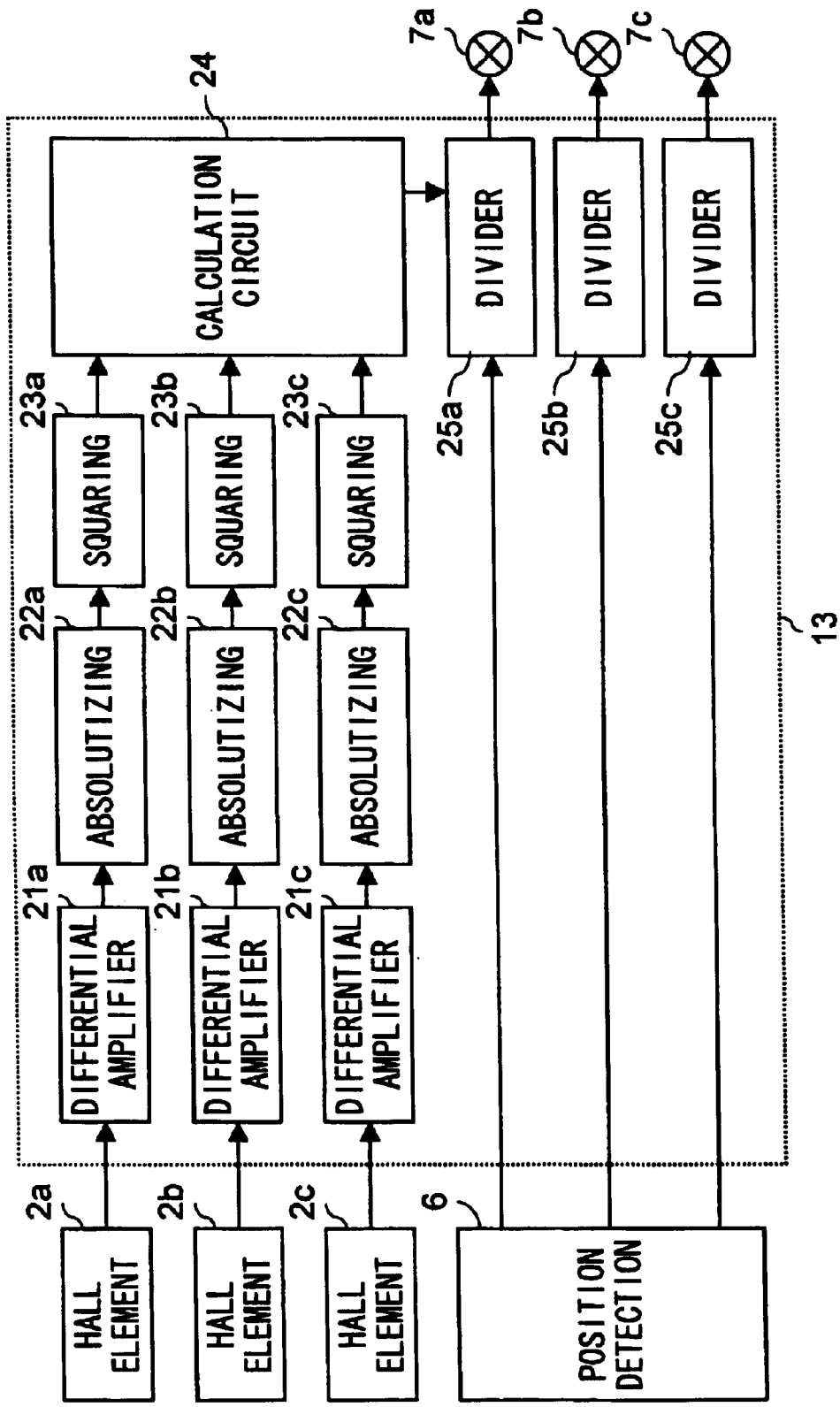

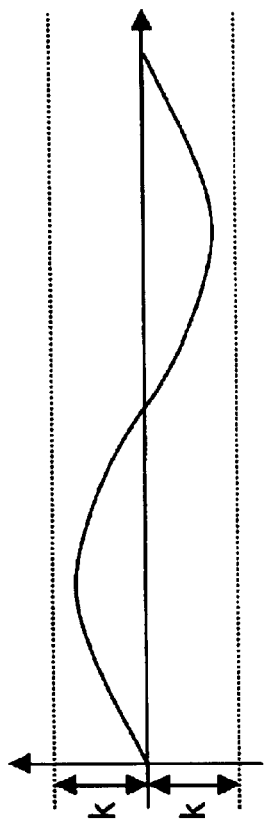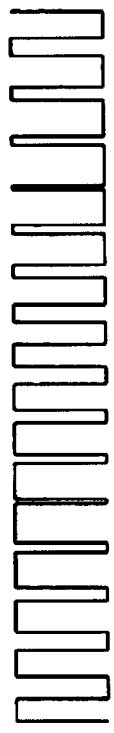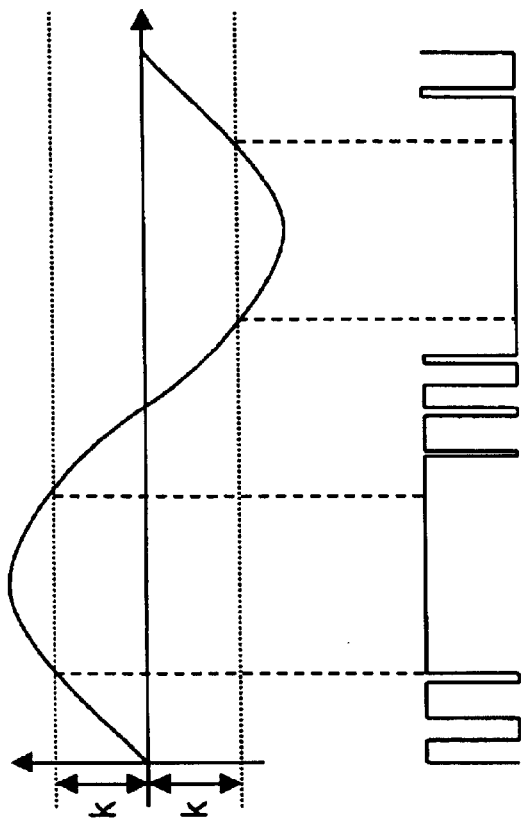
FIG.7A PRIOR ART
FIG.7B PRIOR ART
FIG.7C PRIOR ART
FIG.7D PRIOR ART

MOTOR DRIVER

This application is based on Japanese Patent Application No. 2003-028331 filed on Feb. 5, 2003, the contents of which are hereby incorporated by reference.

BACKGROUND OF THE INVENTION

1. Field of the Invention

The present invention relates to a motor driver for a brushless motor provided with Hall elements for detecting the rotation position of the rotor, such as a spindle motor used in a CD (compact disk) or DVD (digital versatile disk) drive.

2. Description of the Prior Art

Some conventional brushless motors are of the type that recognizes the rotation position of the rotor by the use of Hall elements and that performs feedback control on the basis of the Hall signals from those Hall elements. As an example of such brushless motors that perform feedback control on the basis of Hall signals, there has been proposed a motor speed controller that recognizes the rotation angle of a motor on the basis of Hall signals and eliminates motor torque ripple components (Japanese Patent Registered No. 3281561). Moreover, as a prior-art technique, there has been proposed a driving controller that, by recognizing the rotor position on the basis of Hall signals, recognizes the conditions of the individual three-phase currents for driving a brushless motor and that varies the duty factors of the individual phases through calculations performed by a microcomputer so as to achieve PWM (pulse-width modulation) control (Japanese Patent Application Laid-Open No. 2001-136772).

In the motor speed controller proposed in Japanese Patent Registered No. 3281561, the rotation angle of the rotor is found on the basis of the magnetic pole position of the rotor as detected by Hall elements and the pulses generated by the motor during a single turn thereof as detected by an MR sensor, then the value to be read out from a torque ripple correction memory is determined on the basis of that rotation angle. Then, the torque ripple component is calculated on the basis of the value read out from the torque ripple correction memory, and this torque ripple component is eliminated from the motor control signal. On the other hand, in the driving controller proposed in Japanese Patent Application Laid-Open No. 2001-136772, the conditions of the individual phases are recognized on the basis of Hall signals, which are square waves, outputted from Hall elements, and the duty factors are set through calculations performed on the basis of the thus recognized conditions and the current levels of the individual phases.

In addition to the configurations proposed in Japanese Patent Registered No. 3281561 and Japanese Patent Application Laid-Open No. 2001-136772, where the Hall signals from Hall elements are used simply to recognize the magnetic position of the rotor or to recognize the conditions of the individual phases, there have conventionally been used also motor drivers of the type that drives and controls a motor by multiplying a torque error signal by Hall signals themselves so as to shift the phases of the individual phases. FIG. 6 shows the configuration of a motor driver that operates on this principle.

The motor driver shown in FIG. 6 includes: an adder circuit 3 that is fed with a torque instruction signal that indicates a target current level; a low-pass filter (LPF) 4 that eliminates noise from the output of the adder circuit 3; a limiter 5 that imposes a limit on the output level of the low-pass filter 4; a position detection circuit 6 that recognizes the magnetic pole position of the rotor by means of Hall elements 2a to 2c of a brushless motor 1 to output position signals, which are sinusoidal waves; multiplier circuits 7a to 7c that multiply the position signals from the position detection circuit 6 by the output level of the limiter 5 to generate pseudo-sinusoidal waves; a phase shift circuit 8 that shifts the pseudo-sinusoidal waves from the multiplier circuits 7a to 7c each by ⅙π to output three-phase pseudo-sinusoidal waves; a PWM conversion circuit 9 that converts the three-phase pseudo-sinusoidal waves from the phase shift circuit 8 individually into PWM signals on the basis of a triangular wave from a triangular wave generation circuit 10; a triangular wave generation circuit 10 that generates a triangular wave; a driving control circuit 11 that outputs, on the basis of the three-phase PWM signals from the PWM conversion circuit 9, driving output currents to be fed to the three-phase coils (not illustrated) provided inside the brushless motor 1; and a current detection circuit 12 that detects the current level of the driving output currents outputted from the driving control circuit 11.

The motor driver shown in FIG. 6 operates in the following manner. In the adder circuit 3, the current level of driving output currents as detected by the current detection circuit 12 is subtracted from a torque instruction signal, which represents the target current level. The resulting torque error signal then has noise eliminated therefrom by the low-pass filter 4, and then has a limit imposed on the level thereof by the limiter 5. On the other hand, when three-phase Hall signals from the Hall elements 2a to 2c, which represent the magnetic pole position of the rotor, are fed to the position detection circuit 6, the position detection circuit 6 generates and outputs position signals with reference to which to feed three-phase driving output currents.

Thereafter, in the multiplier circuits 7a to 7c, the torque error signal from the limiter 5 is multiplied by the position signals, which are sinusoidal waves, to generate pseudo-sinusoidal signals. Then, in the phase shift circuit 8, the phases of the pseudo-sinusoidal signals are shifted each by ⅙π to generate three-phase pseudo-sinusoidal signals. Then, in the PWM conversion circuit 9, these three-phase pseudo-sinusoidal signals are individually subjected to PWM conversion on the basis of the triangular wave outputted from the triangular wave generation circuit 10 to generate three-phase PWM signals. On the basis of these three-phase PWM signals, the driving control circuit 11 generates driving output currents to be fed to the three-phase coil (not illustrated) of the brushless motor 1 to drive and control the brushless motor 1.

With the motor driver configured as shown in FIG. 6, when the amplitude of the Hall signals from the Hall elements 2a to 2c of the brushless motor 1 is within the range that permits normal operation, and the amplitude of the pseudo-sinusoidal signals obtained by multiplying the Hall signals by the torque error signal is not larger than the level corresponding to about twice the PWM conversion pulse width, the motor driver shown in FIG. 6 can feed pseudo-sinusoidal currents to the individual phases. This allows low-vibration, low-noise rotation. Accordingly, in this state, the phase shift circuit 8 outputs pseudo-sinusoidal signals having an amplitude smaller than a predetermined level k as shown in FIG. 7A, and thus the PWM conversion circuit 9 outputs normally converted PWM signals as shown in FIG. 7B.

However, when the amplitude of the Hall signals from the Hall elements 2a to 2c is so large that the amplitude of the pseudo-sinusoidal signals obtained by multiplying the Hall signals by the torque error signal is larger than the level corresponding to about twice the PWM conversion pulse width, distortion occurs in the current level of the driving output currents outputted from the driving control circuit 11. Accordingly, in this state, the phase shift circuit 8 outputs pseudo-sinusoidal signals having an amplitude larger than the predetermined level k as shown in FIG. 7C, and thus, when the pseudo-sinusoidal signals have a level higher than k or lower than –k, the range in which the duty ratio is 100% or 0% is so wide that the resulting PWM signals remain high or low almost throughout the PWM conversion pulse width. Thus, the PWM conversion circuit 9 outputs PWM signals converted as shown in FIG. 7D.

This makes it impossible to smoothly drive the three-phase coil (not illustrated) of the brushless motor 1 with the pseudo-sinusoidal signals, with the result that the brushless motor 1 rotates with torque fluctuations and with noise. To avoid this, the limiter 5 limits the level of the torque error signal so that the amplitude of the pseudo-sinusoidal signals does not become larger than the predetermined level k. However, the Hall elements 2 (i.e., 2a to 2c) of the brushless motor 1 have large fabrication variations, and this necessitates a complicated setting procedure to set the limit level of the limiter 5 to suit the output characteristics of the Hall elements 2 of the brushless motor 1.

Even when the limit level of the limiter 5 is set optimally, owing to the temperature characteristics of the Hall elements 2, the levels of the Hall signals vary with the ambient temperature, and thus the amplitude of the position signals generated from those Hall signals by the position detection circuit 6 also varies. Since the pseudo-sinusoidal signals are obtained by multiplying the torque error signal, which is limited within the limit level, by those position signals, whose amplitude may thus be too large depending on the ambient temperature, the pseudo-sinusoidal signals can have an amplitude as shown in FIG. 7C, generating PWM signals as shown in FIG. 7D. This causes the brushless motor 1 to rotate with torque fluctuations and with noise. On the other hand, when the amplitude of the position signals becomes too small depending on the ambient temperature, the maximum rotation rate becomes lower than is set, resulting in performance lower than is expected.

SUMMARY OF THE INVENTION

An object of the present invention is to provide a motor driver that normalizes the amplitude of the position signals that represent the rotation position of the rotor of a brushless motor and that achieves PWM drive control by the use of those normalized position signals.

To achieve the above object, according to one aspect of the present invention, a motor driver is provided with: a driving control circuit that feeds n-phase driving output currents to a motor provided with n position detecting elements, for detecting a rotation position of a rotor, and with n-phase coils; a position detection circuit that outputs position signals that indicate the rotation position of the rotor on the basis of the outputs of the position detecting elements; a sinusoidal signal generation circuit that generates n-phase pseudo-sinusoidal signals on the basis of the position signals; and a PWM conversion circuit that feeds the driving control circuit with n-phase PWM signals obtained by performing PWM conversion individually on the n-phase pseudo-sinusoidal signals from the sinusoidal signal generation circuit. Here, the position detection circuit feeds the position signals to the sinusoidal signal generation circuit after normalizing the amplitude of the position signals.

According to another aspect of the present invention, a motor driver is provided with: a driving control circuit that feeds n-phase driving output currents to a motor provided with n position detecting elements, for detecting a rotation position of a rotor, and with n-phase coils; a position detection circuit that outputs position signals that indicate the rotation position of the rotor on the basis of the outputs of the position detecting elements; an amplitude normalization circuit that finds the amplitude of the outputs of the n position detecting elements and that divides by the thus found amplitude the position signals from the position detection circuit and thereby normalizes the position signals; a sinusoidal signal generation circuit that generates n-phase pseudo-sinusoidal signals on the basis of the position signals normalized by the amplitude normalization circuit; and a PWM conversion circuit that feeds the driving control circuit with n-phase PWM signals obtained by performing PWM conversion individually on the n-phase pseudo-sinusoidal signals from the sinusoidal signal generation circuit.

BRIEF DESCRIPTION OF THE DRAWINGS

This and other objects and features of the present invention will become clear from the following description, taken in conjunction with the preferred embodiments with reference to the accompanying drawings in which:

FIG. 2 is a block diagram showing the internal configuration of the amplitude normalization circuit provided in the motor driver shown in FIG. 1;

FIGS. 7A to 7D are diagrams showing the waveforms observed at relevant points in the motor driver shown in FIG. 6.

DESCRIPTION OF THE PREFERRED EMBODIMENTS

First Embodiment

Figure 1:
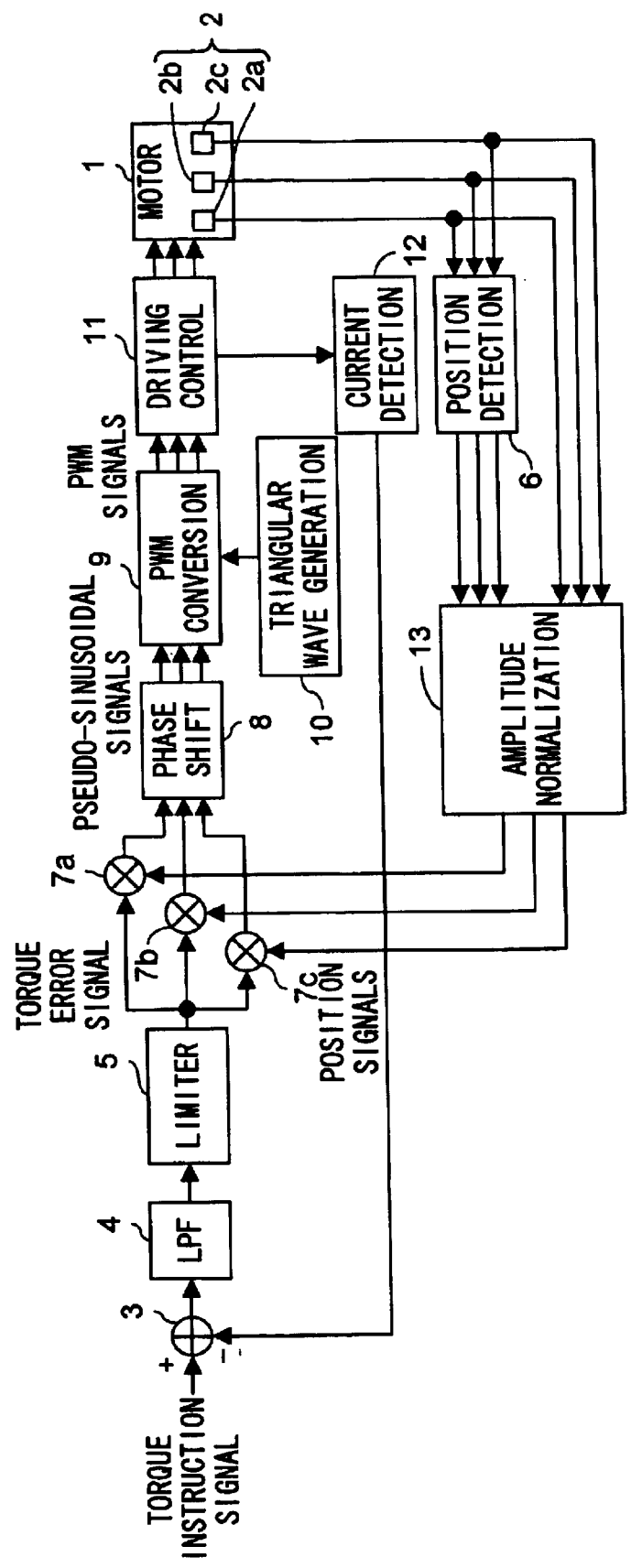
FIG. 1 is a block diagram showing the internal configuration of the motor driver of a first embodiment of the invention.

First, a first embodiment of the present invention will be described with reference to the drawings. FIG. 1 is a block diagram showing the configuration of the three-phase motor driver of the first embodiment. In the motor driver shown in FIG. 1, such blocks as are found also in FIG. 6 are identified with the same reference numerals, and their detailed explanations will not be repeated.

Figure 6:
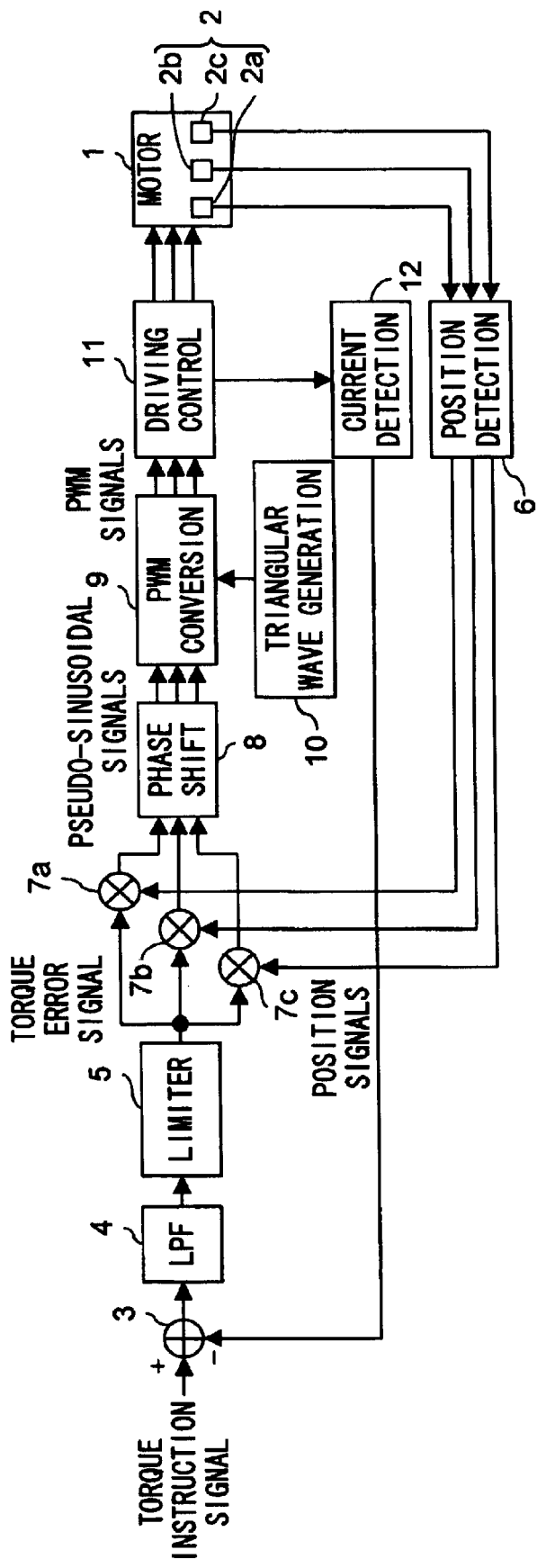
FIG. 6 is a block diagram showing the internal configuration of a conventional motor driver.

The motor driver shown in FIG. 1, as compared with the configuration shown in FIG. 6, additionally includes an amplitude normalization circuit 13 that normalizes the amplitude of the position signals from the position detection circuit 6. As shown in FIG. 2, this amplitude normalization circuit 13 includes: differential amplifier circuits 21a to 21c that differentially amplify the Hall signals, composed of a pair of a positive and a negative signal for each phase, from the Hall elements 2a to 2c respectively; absolutizing circuits 22a to 22c that absolutize the outputs of the differential amplifier circuits 21a to 21c respectively; squaring circuits 23a to 23c that square the outputs of the absolutizing circuits 22a to 22c respectively; a calculation circuit 24 that multiplies by $(1/6)^{0.5} \times \alpha$ the value obtained by raising to the power of ½ the sum of the outputs of the squaring circuits 23a to 23c respectively (here, it is assumed that the amplitude of the position signals is a times the amplitude of the Hall signals); and divider circuits 25a to 25c that divide the three-phase position signals from the position detection circuit 6 individually by the output of the calculation circuit 24.

In the motor driver configured as described above so as to additionally include the amplitude normalization circuit 13, the amplitude normalization circuit 13 normalizes individually the amplitude of the three-phase position signals outputted from the position detection circuit 6, and then feeds them to the multiplier circuits 7a to 7c. Then, as in the motor driver shown in FIG. 6, the current level of the driving output currents from the driving control circuit 11 as detected by the current detection circuit 12 and a torque instruction signal are fed to the adder circuit 3, which then outputs a torque error signal that represents the difference obtained by subtracting from the torque instruction signal the detected current level of the driving output currents. This torque error signal then has noise eliminated therefrom by the LPF 4, then has the level thereof limited within a predetermined level by the limiter 5, and is then fed to the multiplier circuits 7a to 7c.

The multiplier circuits 7a to 7c, by multiplying the torque error signal fed thereto individually by the position signals, which have wave forms close to sinusoidal, generates three-phase original pseudo-sinusoidal signals that are $\frac{2}{3}\pi$ out of phase with one another. These three-phase original pseudo-sinusoidal signals are fed to the phase shift circuit 8, which shifts their phases each by $\frac{1}{6}\pi$ to generate pseudo-sinusoidal signals. These three-phase pseudo-sinusoidal signals are fed to the PWM conversion circuit 9, where they are converted into three-phase PWM signals of which the duty rations are determined as a result of the three-phase pseudo-sinusoidal signals being compared with a triangular wave from the triangular wave generation circuit 10. Then, on the basis of the three-phase PWM signals, the driving control circuit 11 generates three-phase driving output currents, which are then fed respectively to the three-phase coils of the brushless motor 1, with the result that the brushless motor 1 rotates. Incidentally, by setting the sensing positions of the Hall elements 2a to 2c to be each shifted by $\frac{1}{6}\pi$, it is possible to omit the phase shift circuit 8.

Figure 3A:
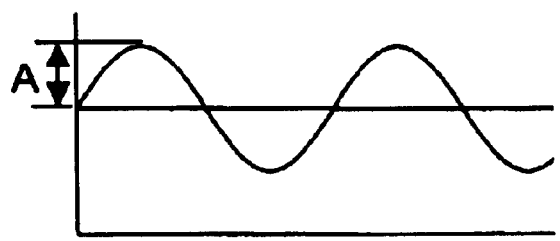
FIGS. 3A to 3E are diagrams showing the waveforms observed at relevant points in the amplitude normalization circuit shown in FIG. 2.
Figure 3B:
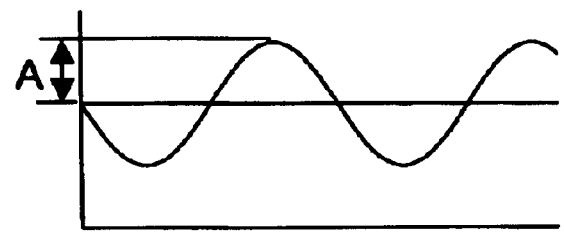

In the motor driver that operates as described above, the amplitude normalization circuit 13 operates as described below with reference to the waveform diagrams shown in FIGS. 3A to 3E. In the brushless motor 1, the Hall elements 2a to 2c are located 120° apart from one another. Thus, the Hall signals from the Hall elements 2a to 2c are $\frac{2}{3}\pi$ out of phase with one another. Accordingly, from each of the Hall elements 2a to 2c are outputted Hall signals that are composed of a pair of a positive signal as shown in FIG. 3A and a negative signal as shown in FIG. 3B, which are expressed as $H \pm A \times \sin\theta$, $H \pm A \times \sin(\theta + \frac{2}{3}\pi)$, and $H \pm A \times \sin(\theta - \frac{2}{3}\pi)$ (where H represents the direct-current component, and A represents the amplitude of the alternating-current component) for the three Hall elements 2a to 2c respectively.

Figure 3C:
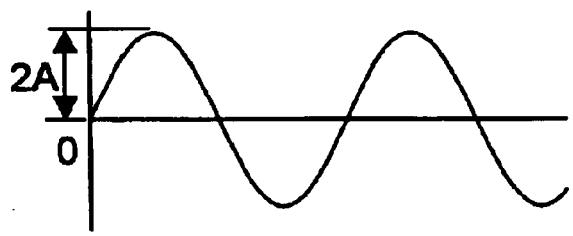

These Hall signals from the Hall elements 2a to 2c are then fed to the differential amplifier circuits 21a to 21c provided within the amplitude normalization circuit 13. For example, with respect to, among others, the inputs to the differential amplifier circuit 21a, the output obtained by subtracting the negative-side Hall signal from the positive-side Hall signal equals $(H + A \times \sin\theta) - (H - A \times \sin\theta) = 2A \times \sin\theta$. That is, as shown in FIG. 3C, the outputs of the differential amplifier circuits 21a to 21c equal $2A \times \sin\theta$, $2A \times \sin(\theta + \frac{2}{3}\pi)$, and $2A \times \sin(\theta - \frac{2}{3}\pi)$ respectively, and these are then fed to the absolutizing circuits 22a to 22c.

Figure 3D:
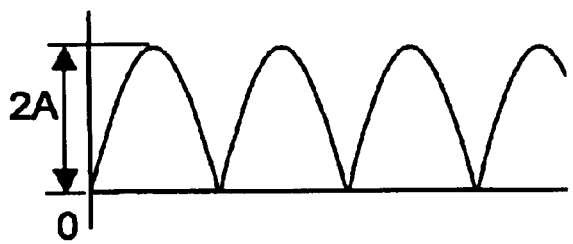
Figure 3E:
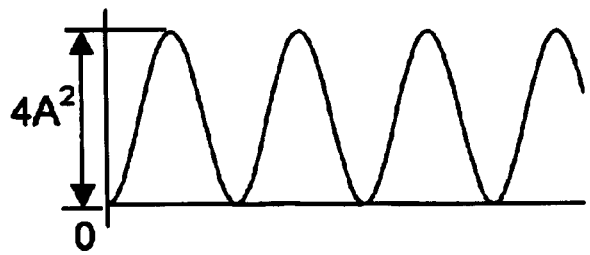

Thereafter, as shown in FIG. 3D, the absolutizing circuits 22a to 22c absolutize the outputs of the differential amplifier circuits 21a to 21c. Thus, the outputs of the absolutizing circuits 22a to 22c equal $|2A \times \sin\theta|$, $|2A \times \sin(\theta + \frac{2}{3}\pi)|$, and $|2A \times \sin(\theta - \frac{2}{3}\pi)|$ respectively. These outputs of the absolutizing circuits 22a to 22c are fed to the squaring circuits 23a to 23c respectively so as to be squared. Thus, as shown in FIG. 3E, the outputs of the squaring circuits 23a to 23c equal $4A^2 \times \sin^2\theta$, $4A^2 \times \sin^2(\theta + \frac{2}{3}\pi)$, and $4A^2 \times \sin^2(\theta - \frac{2}{3}\pi)$, and these are then fed to the calculation circuit 24.

In the calculation circuit 24, first, the outputs of the squaring circuits 23a to 23c are added together to calculate their sum $4A^2 \times (\sin^2\theta + \sin^2(\theta + \frac{2}{3}\pi) + \sin^2(\theta - \frac{2}{3}\pi))$, and the result is then raised to the power of ½. The result is expressed by formula (1) blow. The relationship expressed by formula (2) below gives the value of formula (1) as $A \times 6^{0.5}$. By multiplying the thus found value of formula (1) by $(1/6)^{0.5} \times \alpha$, the amplitude $\alpha \times A$ of the position signals is found.

$$(4A^2 \times (\sin^2\theta + \sin^2(\theta + \frac{2}{3}\pi) + \sin^2(\theta - \frac{2}{3}\pi)))^{0.5} \quad (1)$$

$$\sin^2\theta + \sin^2(\theta + \frac{2}{3}\pi) + \sin^2(\theta - \frac{2}{3}\pi) = \frac{3}{2} \quad (2)$$

The amplitude $\alpha \times A$ thus found by the calculation circuit 24 is then fed to each of the divider circuits 25a to 25c, where the three-phase position signals outputted from the position detection circuit 6 are individually divided by the amplitude $\alpha \times A$ found by the calculation circuit 24. Here, since the position detection circuit 6 generates the three-phase position signals respectively on the basis of the Hall signals, and those three-phase position signals have an amplitude of $\alpha \times A$, by dividing the three-phase position signals each by the amplitude $\alpha \times A$ found by the calculation circuit 24, it is possible to make the amplitude of the three-phase position signals equal to 1 and thereby normalize them.

The three-phase position signals thus normalized so as to have an amplitude equal to 1 are then fed from the amplitude normalization circuit 13 to the multiplier circuits 7a to 7c respectively. Thus, the amplitude of the position signals fed to the multiplier circuits 7a to 7c is constant irrespective of the amplitude of the Hall signals. That is, the amplitude of all the original pseudo-sinusoidal signals generated by the multiplier circuits 7a to 7c depends on the level of the torque error signal limited by the limiter 5, and thus is not affected by the amplitude of the Hall signals from the Hall elements 2a to 2c as is conventionally the case. This eliminates the need to take into consideration the output range of the Hall elements 2a to 2c in selecting the brushless motor 1 to be driven and controlled, and also helps avoid the influence of the temperature characteristics of the Hall elements 2a to 2c.

Second Embodiment

Figure 4:
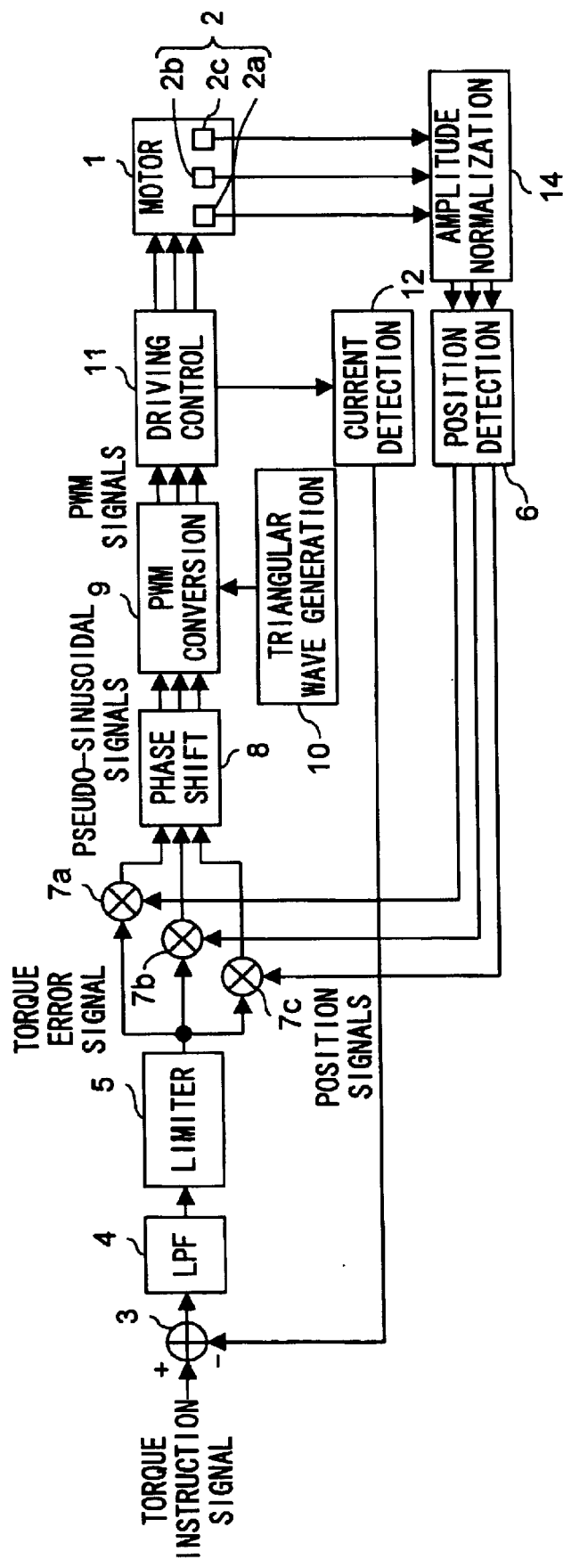
FIG. 4 is a block diagram showing the internal configuration of the motor driver of a second embodiment of the invention.

Next, a second embodiment of the present invention will be described with reference to the drawings. FIG. 4 is a block diagram showing the configuration of the motor driver of the second embodiment. In the motor driver shown in FIG. 4 and the amplitude normalization circuit shown in FIG. 5, such blocks as are found also in FIGS. 1 and 2 are identified with the same reference numerals, and their detailed explanations will not be repeated.

Figure 5:
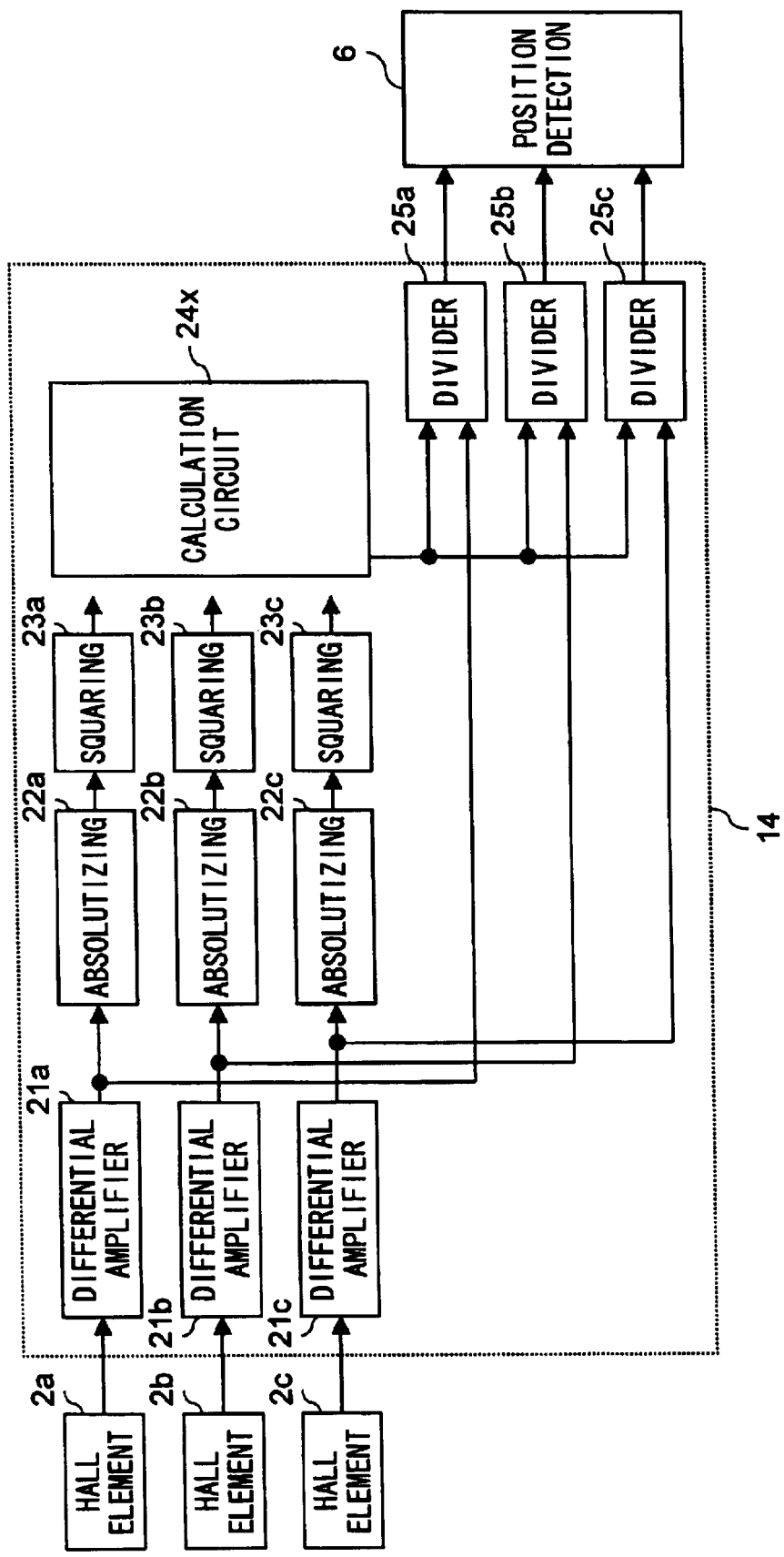
FIG. 5 is a block diagram showing the internal configuration of the amplitude normalization circuit provided in the motor driver shown in FIG. 4.

The motor driver shown in FIG. 4 includes, instead of the amplitude normalization circuit 13 shown in FIG. 1, an amplitude normalization circuit 14 that feeds the Hall signals from the Hall elements 2a to 2c to the position detection circuit 6 after normalizing the amplitude of those signals. As shown in FIG. 5, this amplitude normalization circuit 14 includes: differential amplifier circuits 21a to 21c; absolutizing circuits 22a to 22c; squaring circuits 23a to 23c; a calculation circuit 24x that multiplies by $(1/6)^{0.5} \times 2$ the value obtained by raising to the power of ½ the sum of the outputs of the squaring circuits 23a to 23c; and divider circuits 25a to 25c that divide by the output of the calculation circuit 24x the Hall signals differentially amplified by the differential amplifier circuits 21a to 21c.

In the motor driver configured as described above, the amplitude normalization circuit 14 normalizes the amplitude of the Hall signals outputted respectively from the Hall elements 2a to 2c, and then feeds them to the position detection circuit 6. Thus, the position detection circuit 6 receives, in a normalized form, the Hall signals outputted respectively from the Hall elements 2a to 2c, and generates three-phase position signals on the basis of those normalized Hall signals. Thus, the multiplier circuits 7a to 7c receive normalized three-phase position signals. Except the amplitude normalization circuit 14 and the position detection circuit 6 operating in this way, the individual circuit blocks operate in the same manner as in the motor driver of the first embodiment, and therefore the explanations of the operation of the other circuit blocks will be omitted. Here, the position detection circuit 6 receives differentially amplified Hall signals, and therefore it does not need to be provided with a differentially amplifying function.

Moreover, in the amplitude normalization circuit 14, the differential amplifier circuits 21a to 21c, the absolutizing circuits 22a to 22c, and the squaring circuits 23a to 23c operate in the same manner as in the first embodiment. As a result, when the amplitude normalization circuit 14 receives, from the Hall elements 2a to 2c respectively, Hall signals that are equal to H±A×sin θ, H±A×sin(θ+⅔π), and H±A×sin(θ−⅔π), the calculation circuit 24x is fed with outputs that equal $4A^2 \times \sin^2 \theta$, $4A^2 \times \sin^2(\theta + \frac{2}{3}\pi)$, and $4A^2 \times \sin^2(\theta - \frac{2}{3}\pi)$.

Then, in the calculation circuit 24x, first, as in the first embodiment, the sum of the outputs of the squaring circuits 23a to 23c is raised to the power of ½ to find the value of $(4A^2 \times (\sin^2 \theta + \sin^2(\theta + \frac{2}{3}\pi) + \sin^2(\theta - \frac{2}{3}\pi)))^{0.5}$. The result equals $A \times 6^{0.5}$, and, by multiplying this by $(1/6^{0.5}) \times 2$, the amplitude 2A of the differentially amplified Hall signals is found.

The amplitude 2A thus found by the calculation circuit 24x is then fed to each of the divider circuits 25a to 25c, where the Hall signals differentially amplified by the differential amplifier circuits 21a to 21c are individually divided by the amplitude 2A found by the calculation circuit 24x. Here, since the Hall signals differentially amplified by the differential amplifier circuits 21a to 21c have an amplitude of 2A, by dividing the Hall signals by the amplitude 2A found by the calculation circuit 24x, it is possible to make the amplitude of the differentially amplified Hall signals equal to 1 and thereby normalize them.

In the embodiments, the amplitude of the differentially amplified Hall signals is normalized. It is, however, also possible to normalize the amplitude of each of the two, positive and negative, signals constituting each Hall signal before being differentially amplified. In that case, the position detection circuit 6 needs to be additionally provided with a function of differentially amplifying the Hall signals.

The embodiments deal only with a three-phase brushless motor. It is, however, possible to apply similar configurations to a brushless motor having a larger number of phases.

According to the present invention, position signals are normalized according to the amplitude of the output levels of position detecting elements of a brushless motor. This makes it possible to keep the amplitude of the position signals constant even when the position detecting elements of the brushless motor to be driven and controlled have different output ranges. This eliminates the need to limit the output ranges of the position detecting elements of the brushless motor to be driven and controlled as is conventionally practiced, and also helps prevent the influence of the temperature characteristics of the position detecting elements. Moreover, it is no longer necessary to change the limit imposed on the parameter quantity by which to multiply the position signals according to the output ranges of the position detecting elements of the brushless motor to be driven and controlled as is conventionally practiced.

What is claimed is:

1. A motor driver comprising:
   a driving control circuit that feeds n-phase driving output currents to a motor provided with n position detecting elements, for detecting a rotation position of a rotor, and with n-phase coils;
   a position detection circuit that outputs position signals that indicate the rotation position of the rotor on a basis of outputs of the position detecting elements;
   a sinusoidal signal generation circuit that generates n-phase pseudo-sinusoidal signals on a basis of the position signals; and
   a PWM conversion circuit that feeds the driving control circuit with n-phase PWM signals obtained by performing PWM conversion individually on the n-phase pseudo-sinusoidal signals from the sinusoidal signal generation circuit,
   wherein the position detection circuit feeds the position signals to the sinusoidal signal generation circuit after normalizing an amplitude of the position signals.

2. A motor driver as claimed in claim 1, further comprising:
   a current setting circuit that sets a current level of the driving output currents fed from the driving control circuit to the motor,
   wherein the sinusoidal signal generation circuit converts the position signals from the position detection circuit into position signals commensurate with the current level set by the current setting circuit, and then generates the n-phase pseudo-sinusoidal signals on a basis of the so converted position signals.

3. A motor driver as claimed in claim 2,
   wherein the current setting circuit comprises:
      a current detection circuit that detects the current level of the driving output currents outputted from the driving control circuit; and
      a subtractor circuit that subtracts from a target current level the current level of the driving output currents as detected by the current detection circuit,
   an output of the subtractor circuit being fed, as a parameter quantity that indicates a current level to be fed to the motor, to the sinusoidal signal generation circuit.

4. A motor driver as claimed in claim 3,
   wherein the current setting circuit further comprises:
      a low-pass filter that eliminates noise from the output of the subtractor circuit; and a limiter that limits an output level of the low-pass filter within a predetermined level, an output of the limiter being fed, as the parameter quantity, to the sinusoidal signal generation circuit.

5. A motor driver as claimed in claim 2, wherein the sinusoidal signal generation circuit comprises:
- a multiplier circuit that multiplies by a parameter quantity from the current setting circuit the position signals normalized by the amplitude normalization circuit; and
- a phase shift circuit that shifts phases of signals outputted from the multiplier circuit.

6. A motor driver as claimed in claim 1, wherein the position detecting elements are Hall elements.

7. A motor driver as claimed in claim 1, wherein the motor is a brushless motor.

8. A motor driver comprising:
- a driving control circuit that feeds n-phase driving output currents to a motor provided with n position detecting elements, for detecting a rotation position of a rotor, and with n-phase coils;
- a position detection circuit that outputs position signals that indicate the rotation position of the rotor on a basis of outputs of the position detecting elements;
- an amplitude normalization circuit that finds an amplitude of the outputs of the n position detecting elements and that divides by the thus found amplitude the position signals from the position detection circuit and thereby normalizes the position signals;
- a sinusoidal signal generation circuit that generates n-phase pseudo-sinusoidal signals on a basis of the position signals normalized by the amplitude normalization circuit; and
- a PWM conversion circuit that feeds the driving control circuit with n-phase PWM signals obtained by performing PWM conversion individually on the n-phase pseudo-sinusoidal signals from the sinusoidal signal generation circuit.

9. A motor driver as claimed in claim 8, further comprising:
- a current setting circuit that sets a current level of the driving output currents fed from the driving control circuit to the motor, wherein the sinusoidal signal generation circuit converts the position signals from the amplitude normalization circuit into position signals commensurate with the current level set by the current setting circuit, and then generates the n-phase pseudo-sinusoidal signals on a basis of the so converted position signals.

10. A motor driver as claimed in claim 9, wherein the current setting circuit comprises:
- a current detection circuit that detects the current level of the driving output currents outputted from the driving control circuit; and
- a subtractor circuit that subtracts from a target current level the current level of the driving output currents as detected by the current detection circuit, an output of the subtractor circuit being fed, as a parameter quantity that indicates a current level to be fed to the motor, to the sinusoidal signal generation circuit.

11. A motor driver as claimed in claim 10, wherein the current setting circuit further comprises:
- a low-pass filter that eliminates noise from the output of the subtractor circuit; and
- a limiter that limits an output level of the low-pass filter within a predetermined level, an output of the limiter being fed, as the parameter quantity, to the sinusoidal signal generation circuit.

12. A motor driver as claimed in claim 8, wherein the amplitude normalization circuit finds the amplitude of the outputs of the position detecting elements on a basis of a sum of values obtained by absolutizing and then squaring the outputs of the position detecting elements respectively.

13. A motor driver as claimed in claim 9, wherein the sinusoidal signal generation circuit comprises:
- a multiplier circuit that multiplies by a parameter quantity from the current setting circuit the position signals normalized by the amplitude normalization circuit; and
- a phase shift circuit that shifts phases of signals outputted from the multiplier circuit.

14. A motor driver as claimed in claim 8, wherein n equals three so that there are provided three of the position detecting elements outputting three-phase outputs, and wherein the amplitude normalization circuit comprises:
- first, second, and third differential amplifier circuits that differentially amplify the three-phase outputs of the position detecting elements respectively;
- first, second, and third absolutizing circuits that absolutize output levels of the first, second, and third differential amplifier circuits;
- first, second, and third squaring circuits that square output levels of the first, second, and third absolutizing circuits;
- a calculation circuit that finds the amplitude of the outputs of the position detecting elements on a basis of a value obtained by raising to a power of ½ a sum of the outputs of the first, second, and third squaring circuits respectively.

15. A motor driver as claimed in claim 14, wherein the calculation circuit finds the amplitude of the outputs of the position detecting elements by multiplying by $\alpha \times (\frac{1}{6})^{0.5}$ the value obtained by raising to the power of ½ the sum of the outputs of the first, second, and third squaring circuits respectively.

16. A motor driver as claimed in claim 8, wherein the position detecting elements are Hall elements.

17. A motor driver as claimed in claim 8, wherein the motor is a brushless motor.

* * * * *